United States Patent
Dillon

(10) Patent No.: US 7,696,864 B2
(45) Date of Patent: Apr. 13, 2010

(54) VEHICLE INFORMATION DISPLAY APPARATUS, SYSTEM AND METHOD

(76) Inventor: Kevin Dillon, 41 Avon Ct., West Sand Lake, NY (US) 12196

( * ) Notice: Subject to any disclaimer, the term of this patent is extended or adjusted under 35 U.S.C. 154(b) by 220 days.

(21) Appl. No.: 11/561,142

(22) Filed: Nov. 17, 2006

(65) Prior Publication Data

US 2008/0117032 A1  May 22, 2008

(51) Int. Cl.
*B60Q 1/26* (2006.01)
*G09G 5/00* (2006.01)

(52) U.S. Cl. .......................... 340/468; 345/5

(58) Field of Classification Search ............... 340/468, 340/463, 988, 989, 825.45, 524, 461; 345/6, 345/5, 8, 1.1, 1.2, 1.3
See application file for complete search history.

(56) References Cited

U.S. PATENT DOCUMENTS

| | | | |
|---|---|---|---|
| 4,368,979 A * | 1/1983 | Ruell | 356/71 |
| 4,885,572 A * | 12/1989 | Iwata et al. | 340/425.5 |
| 4,916,296 A | 4/1990 | Streck | |
| 5,105,179 A * | 4/1992 | Smith | 340/468 |
| 5,459,304 A | 10/1995 | Eisenmann | |
| 5,963,129 A * | 10/1999 | Warner | 340/468 |
| 6,222,463 B1 | 4/2001 | Rai | |
| 6,404,327 B1 * | 6/2002 | Naddeo | 340/426.11 |
| 6,641,038 B2 | 11/2003 | Gehlot | |
| 6,693,544 B1 | 2/2004 | Hebbecker | |
| 6,731,252 B2 * | 5/2004 | Sugiyama et al. | 345/6 |
| 6,868,313 B2 | 3/2005 | Koljonen | |
| 6,876,296 B2 | 4/2005 | Talmadge | |
| 6,888,445 B2 | 5/2005 | Gotfried | |
| 7,026,918 B2 * | 4/2006 | Briick | 340/426.11 |
| 7,096,102 B1 * | 8/2006 | Parker, Sr. | 701/36 |
| 7,142,104 B1 * | 11/2006 | Blueford | 340/472 |
| 2002/0195490 A1 | 12/2002 | Gehlot | |
| 2003/0112242 A1 | 6/2003 | Vitale | |
| 2004/0004539 A1 | 1/2004 | Collins | |
| 2004/0024501 A1 | 2/2004 | Muehl | |
| 2004/0046646 A1 | 3/2004 | Eskridge | |
| 2004/0131170 A1 | 7/2004 | Wu | |
| 2004/0189493 A1 | 9/2004 | Estus | |
| 2005/0010478 A1 | 1/2005 | Gravelle | |
| 2005/0283388 A1 | 12/2005 | Eberwine | |
| 2006/0025897 A1 | 2/2006 | Shostak et al. | |
| 2006/0103568 A1 | 5/2006 | Powell | |
| 2006/0138222 A1 | 6/2006 | Dearie | |
| 2006/0203323 A1 | 9/2006 | Tonar et al. | |
| 2006/0238368 A1 | 10/2006 | Pederson et al. | |

OTHER PUBLICATIONS

Office Action (Mail Date Feb. 23, 2009) for U.S. Appl. No. 11/671,074—Filing Date Feb. 5, 2007; Confirmation No. 8369.

* cited by examiner

*Primary Examiner*—Benjamin C Lee
*Assistant Examiner*—Sigmund Tang
(74) *Attorney, Agent, or Firm*—Schmeiser, Olsen & Watts LLP

(57) ABSTRACT

A vehicle information identifier apparatus comprises a display, a receiver, a deactivation device, and a substantially encasing member. The vehicle information identifier apparatus, or similarly, the vehicle information apparatus may be practiced according to a vehicle information system by following a method of use thereof.

20 Claims, 12 Drawing Sheets

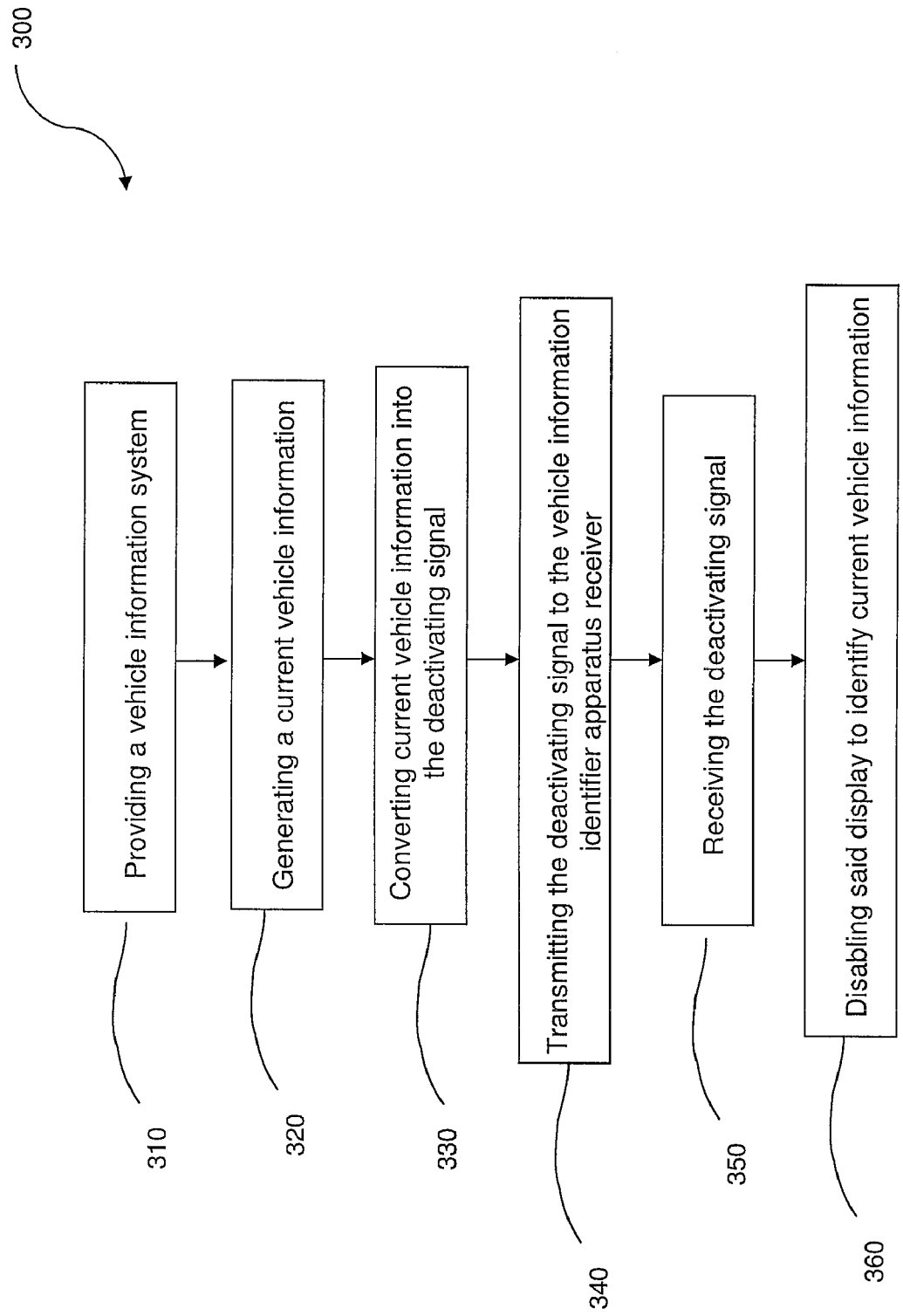

VEHICLE INFORMATION DISPLAY APPARATUS, SYSTEM AND METHOD

BACKGROUND OF THE INVENTION

1. Technical Field

The present invention relates to an apparatus, system, and method of displaying vehicle information so as to securely control an accurate display of vehicle information for a plurality of vehicles.

2. Related Art

Because vehicles may be damaged or may cause damage or injury, it is important that accurate information pertaining to the vehicles be available for retrieval by interested parties. Accordingly, devices, systems and methods have been provided to display information pertaining to vehicles. However, typical vehicle information display devices, systems and methods do not provide for secure and reliable display of accurate vehicle information. Hence, a need exists to provide a vehicle information display apparatus system and method, which, inter alia, prevents and/or reduces property damage, personal injury, and financial losses possibly caused by vehicles.

SUMMARY OF THE INVENTION

A first aspect of the present invention provides a vehicle information system, comprising: a computer having a vehicle database adapted for storing a vehicular status for a plurality of vehicles, a central processor of said computer, for converting a vehicle information into a deactivating signal; a transmitter, for transmitting the deactivating signal; and a vehicle information apparatus, further comprising a display, wherein said display indicates the vehicle information; a receiver, for receiving the deactivating signal from the transmitter; and a deactivation device, wherein the deactivation device is configured to completely disable the display.

A second aspect of the present invention provides a vehicle information identifier apparatus, comprising: a hologram member, said hologram member having a front surface and a back surface; a receiver, said receiver configured to receive a deactivating signal; a deactivation device, said deactivation device including: a deactivating member, said deactivating member coupled to the receiver; and a power source, said power source removably attached to said hologram member; and a substantially encasing member, said encasing member configured to removably attach to a vehicle, said casing forming the outer most component of the vehicle information apparatus.

A third aspect of the present invention provides a method for displaying vehicle information, comprising: providing a vehicle information system, including: a computer having a vehicle database adapted for storing a vehicular status for a plurality of vehicles, a central processor of said computer; and a transmitter, for transmitting a deactivating signal; providing a vehicle information identifier apparatus, including: a display, wherein said display indicates an initial vehicle information; a receiver, for receiving the deactivating signal from the transmitter; and a deactivation device, configured to deactivate the display; generating a current vehicle information; converting said current vehicle information into the deactivating electronic signal; transmitting the deactivating signal to the vehicle information apparatus receiver; receiving said deactivating signal; and disabling said display with said deactivation device to identify the current vehicle information.

BRIEF DESCRIPTION OF THE DRAWINGS

FIG. 12 is a diagram of the method for displaying vehicle information.

DETAILED DESCRIPTION OF THE INVENTION

The present invention provides an apparatus, system, and method for displaying vehicle information. The present invention will be described in association with references to drawings; however, various implementations of the present invention will be apparent to those skilled in the art.

Embodiments of the present invention may prevent and/or reduce property damage, personal injury, and financial losses possibly caused by a vehicle. Vehicle, for purposes of the present invention may be any means in or by which someone travels or something is carried or converted; a means of conveyance or transport. For example, a vehicle may be an automobile, an airplane, a train, a boat, or any other similar device for carrying people or things. In addition, a vehicle information display apparatus may be provided for operation with a vehicle. For instance, a vehicle display apparatus may be removably attached to a vehicle. Such an apparatus may securely display relevant vehicle information in a manner that is easily apparent and readily visible to any observer. The apparatus may be incorporated into and/or managed by a system. The system and/or apparatus may be used in conjunction with and according to a method of operation, such that relevant vehicle information may be readily displayed via the apparatus. When a time comes that the relevant vehicle information creates a situation in which operation of the vehicle creates potential risk of unrecoverable damages, or is in some way non-compliant with governing vehicle operation provisions, the system may deactivate and disable the display apparatus. A disabled display apparatus may be easily contrasted and readily distinguished from an enabled apparatus, allowing an observer to detect that the vehicle is non-compliant in certain respects. Therefore, the apparatus, system, and method of use of the current invention together may yield secure and current information retrieval relating to each vehicle of a plurality of vehicles, and possible compliance of each with laws, regulations, and administrative policies of a region. Embodiments of the present invention may effectively prevent fraud and other deceptive conduct relating to vehicle operation under misinformation. Moreover, embodiments of the present invention may provide information that is easily updateable. Furthermore, embodiments of the present invention may provide an apparatus for displaying vehicle information that is discreet in operation and non-distracting to other vehicle operators or others that may be in the presence and observance of the vehicle. Still further, embodiments of the present invention may provide an efficient and low-cost apparatus for displaying vehicle information that may be easily incorporated into existing systems, in which the present invention of apparatus and method of displaying vehicle information may facilitate monitoring of vehicle information by such an existing system.

Figure 1:
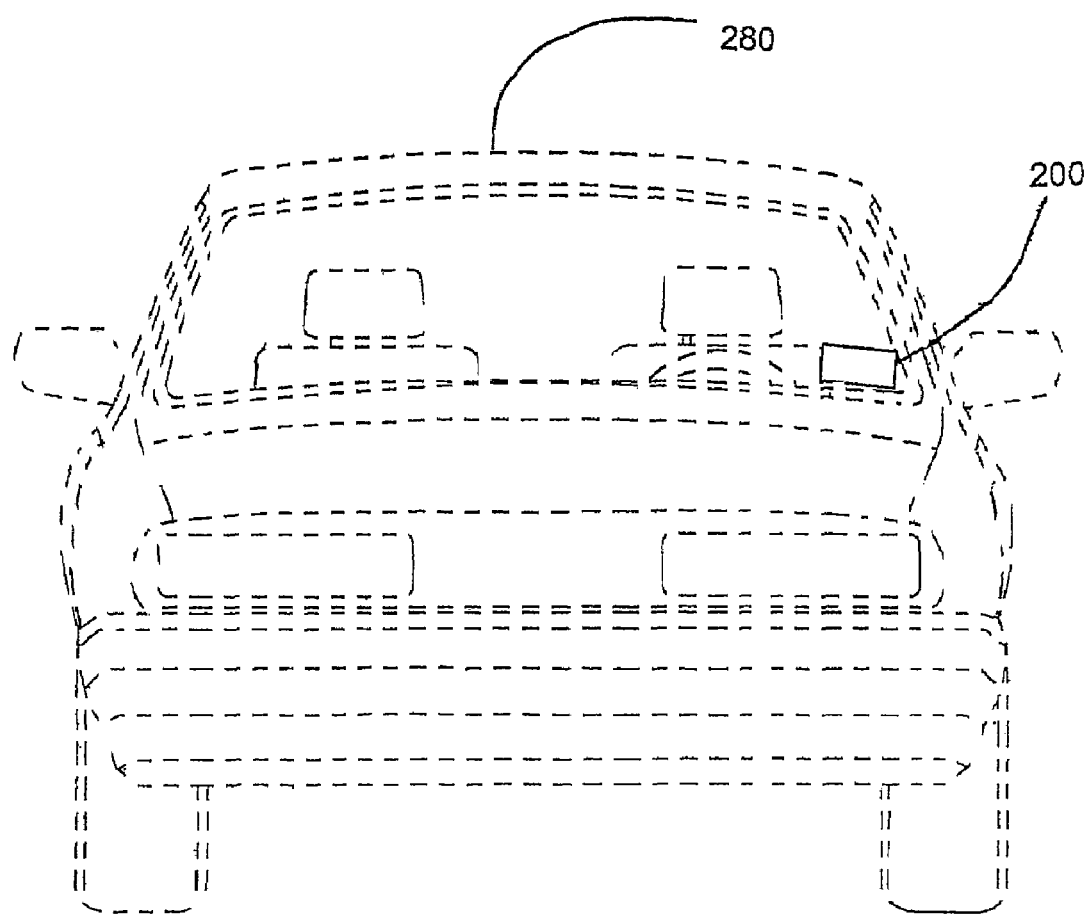
FIG. 1 is a view of the vehicle information apparatus in use with a vehicle.
Figure 2:
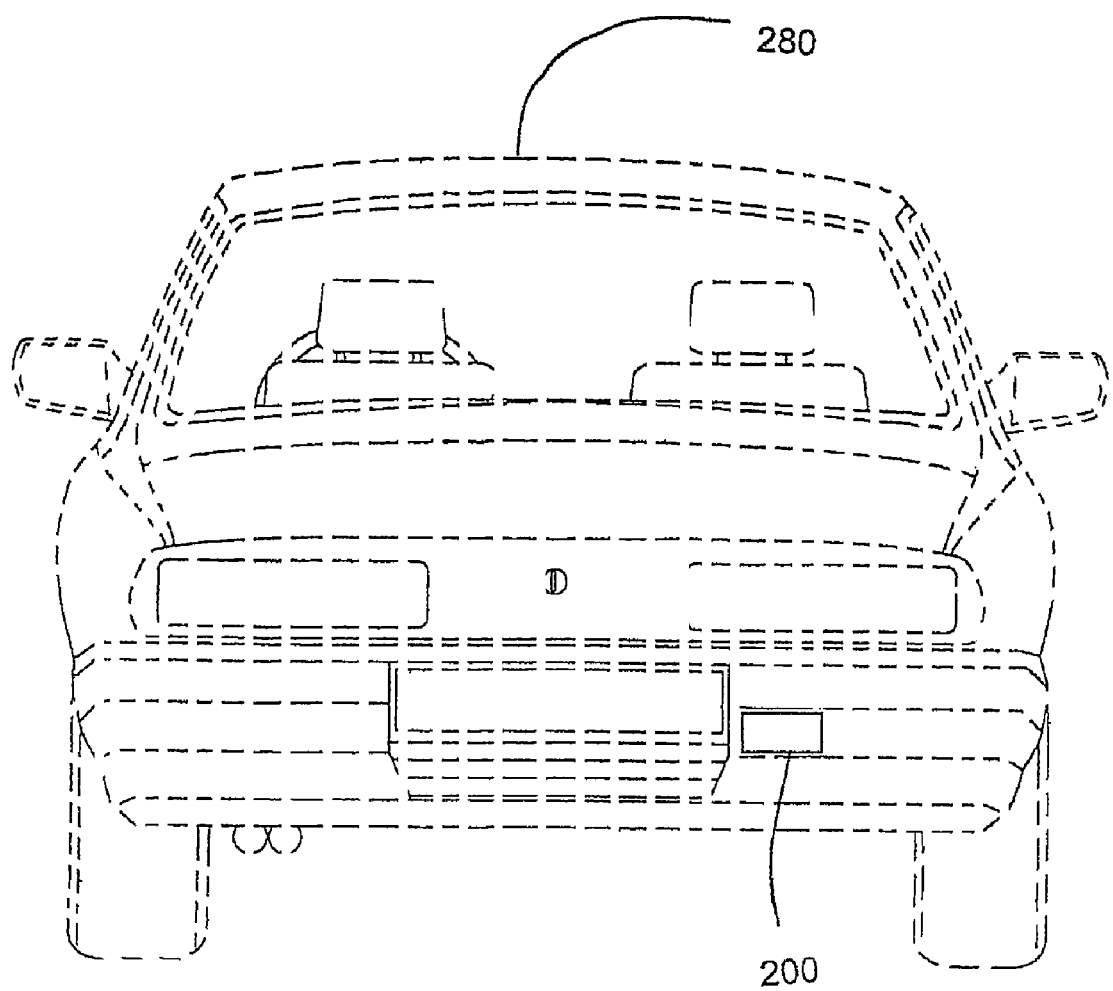
FIG. 2 is a view of the vehicle information apparatus in use with a vehicle.
Figure 3:
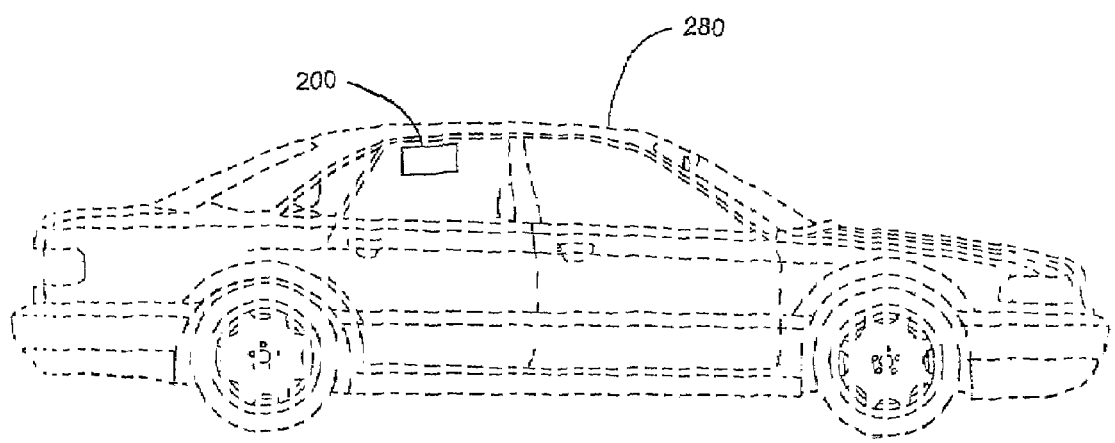
FIG. 3 is a view of the vehicle information apparatus in use with a vehicle.

The related drawings illustrate various but non-limiting embodiments of the present invention comprising, inter alia, a vehicle information system 100, for individually displaying the vehicle information 60 for a plurality of vehicles 21. FIG. 1, FIG. 2, and FIG. 3 illustrate a location of the vehicle information apparatus 200. According to FIG. 1, FIG. 2, and FIG. 3, the vehicle information apparatus 200 may be located in or around a vehicle 280. The vehicle information apparatus 200 should be placed in a locale which is readily visible by observers. For instance pedestrians, other motorists, boat drivers, airport officials, authorized vehicle information system 100 users (further discussed below), law enforcement officers and the like may view the information provided by the vehicle information display apparatus 200. The vehicle information apparatus 200 may be viewed, for example, by an observer's eyes, a photographic image, a digital captured image such as a video, or even an optical or digital scanner. Referring to FIG. 1, the vehicle information apparatus 200 may be placed, for example, on the front windshield. The apparatus 200 may also be placed on the dashboard in close proximity to the windshield so that the vehicle information apparatus 200 is readily apparent and easily visible to observers. However, the vehicle information apparatus may also be located inside the vehicle 280 in close proximity to the rear window of the vehicle 280, so that the vehicle information apparatus 200 is readily visible from an exterior point of the vehicle 280 by an observer. Referring to FIG. 2, the vehicle information apparatus may be located on the exterior of the car. As an example, the vehicle information apparatus 200 may be located in close proximity to the vehicle 280 license plate. However, the vehicle information apparatus 200 may be located in close proximity to either the front or rear license plates. FIG. 3 illustrates that the vehicle information system may be placed on the interior of the car, immediately adjacent to a window on the side of the car, so that it may be readily visible from the outside of the car by an observer. Although FIG. 1, FIG. 2, and FIG. 3 provide exemplary locations of where the vehicle information apparatus may be located, the vehicle information apparatus 200 may be located in or out of the car, so long as it is readily visible to an observer of the vehicle 280. Additionally, it should be noted that the vehicle information identifier apparatus 201 may be similarly located about the vehicle 280 as previously discussed with respect to the vehicle information apparatus 200.

Figure 4:
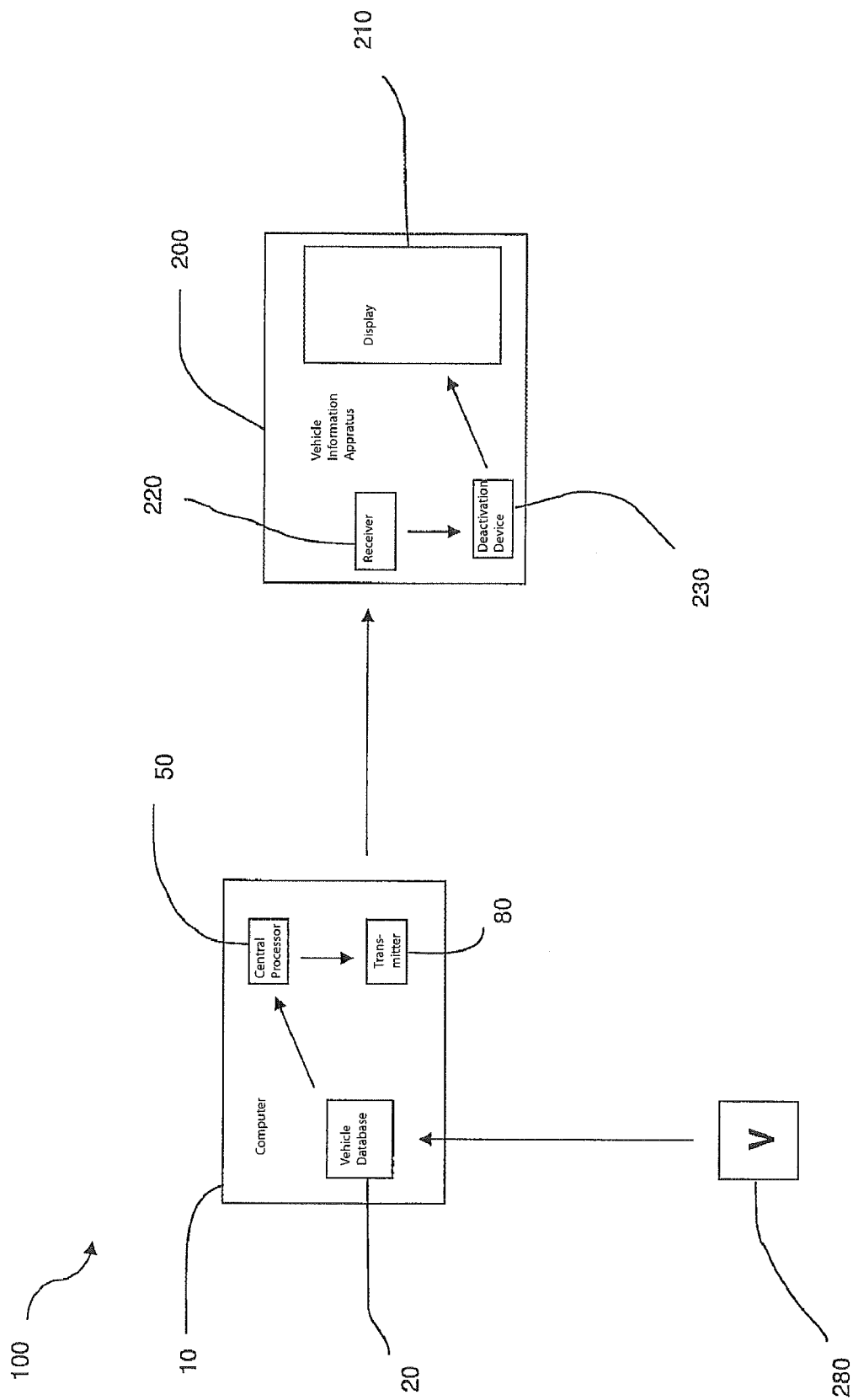
FIG. 4 is a diagram of an embodiment of a vehicle information system.

Referring to FIG. 4, an embodiment of the present invention may comprise a vehicle information system 100 that may include a computer 10, a central processor 50, a transmitter 80, and a vehicle information apparatus 200.

As in FIG. 4, the computer 10 of the vehicle information system 100 may have a vehicle database 20 adapted for storing a vehicular status 30 for a plurality of vehicles 21. The computer 10 may be located at a central location, at a series of satellite locations, at one or more transportable locations, or a combination thereof. The computer 10 may be device operated by that of a local, state, or federal government agency, a local, state, or federal law enforcement agency, or an authorized private user. An example of a government agency with access to the computer 10 of the vehicle information system 100 may include the Department of Motor Vehicles (hereinafter DMV). An authorized private user may include, for example, an insurance company or a registration issuing inspecting service provider. The vehicle database 20 may include a vehicle status 30 for a variety of vehicle-based information variables. For example, certain vehicle status 30 field headings of the vehicle database 20 may include a theft status 31, a DMV status 32, a title status 33, a foreign status 34, a law compliance status 35, an emission status 36, an insurance status 37 a registration status 38, a commercial or public permit status 39, a vehicle identification number (VIN) 40, or an incomplete/unknown status 41.

The many and various types of vehicle statuses may be more thoroughly explained and defined. A theft status 31 may, inter alia, refer to whether the vehicle 280 has been reported stolen. A DMV status 32 may, inter alia, refer to the geographical DMV location for vehicle transactions in the past. A title status 33 may, inter alia, refer to the title owner of record. A foreign status 34 may refer to whether a vehicle is from a foreign country, territory, or state outside that which the local DMV is affiliated. A law compliance status 35 may, inter alia, refer to whether the vehicle currently has any driving or parking citations, or whether the vehicle has recently been reported as involved in an accident or commission of a crime. An emission status 36 may, inter alia, refer to whether the vehicle 280 is currently in compliance with the legislated tolerances of vehicle emissions. An insurance status 37 may, inter alia, refer to whether the insurance of the vehicle 280 is currently active and up-to-date in all respects. A registration status 38 may, inter alia, refer to whether the vehicle 280 is properly registered. A commercial or public permit status 39 may, inter alia, refer to whether the vehicle 280 is affiliated with some commercial application or public transportation service provider. A VIN 40 may, inter alia, refer to the vehicle identification number, which may be a specified number that has been assigned to a vehicle 280 as an identifier. An incomplete/unknown status 41 may, inter alia, refer to a vehicle that may have incomplete data set with respect to the above.

Again referring to FIG. 4, for simplicity, in the further discussion of the present invention the plurality of vehicles 21 will be referred to as a single vehicle V 280. However, it is understood by those skilled in the art that the various embodiments and features discussed with respect to the present invention in terms of a single vehicle, V 280, may also be practiced and incorporated with respect to a plurality of vehicles.

Referring the central processor 50 of the vehicle information system 100, the central processor 50 may be used for converting a vehicle information 60 into a deactivating signal 70. The vehicle information 60 may be a vehicle status 30 of including, but not limited to, an expired registration status 38 or an inactive insurance status 37. An inactive insurance status 37 may include a cancelled, expired, lapsed, or otherwise incomplete or delinquent insurance policy. Examples of the deactivating signal 70 may be, but are not limited to, an electromagnetic signal, a satellite distributed signal, an IR signal, a radio signal, a microwave signal, a laser signal, or a sonic signal. Once the central processor 50 converts the vehicle information 60 into a deactivating signal 70, the central processor 50 may communicate the deactivating signal 70 to the transmitter 80, which may then transmit the deactivating signal 70 to a vehicle 280 having a vehicle information apparatus 200.

Figure 5:
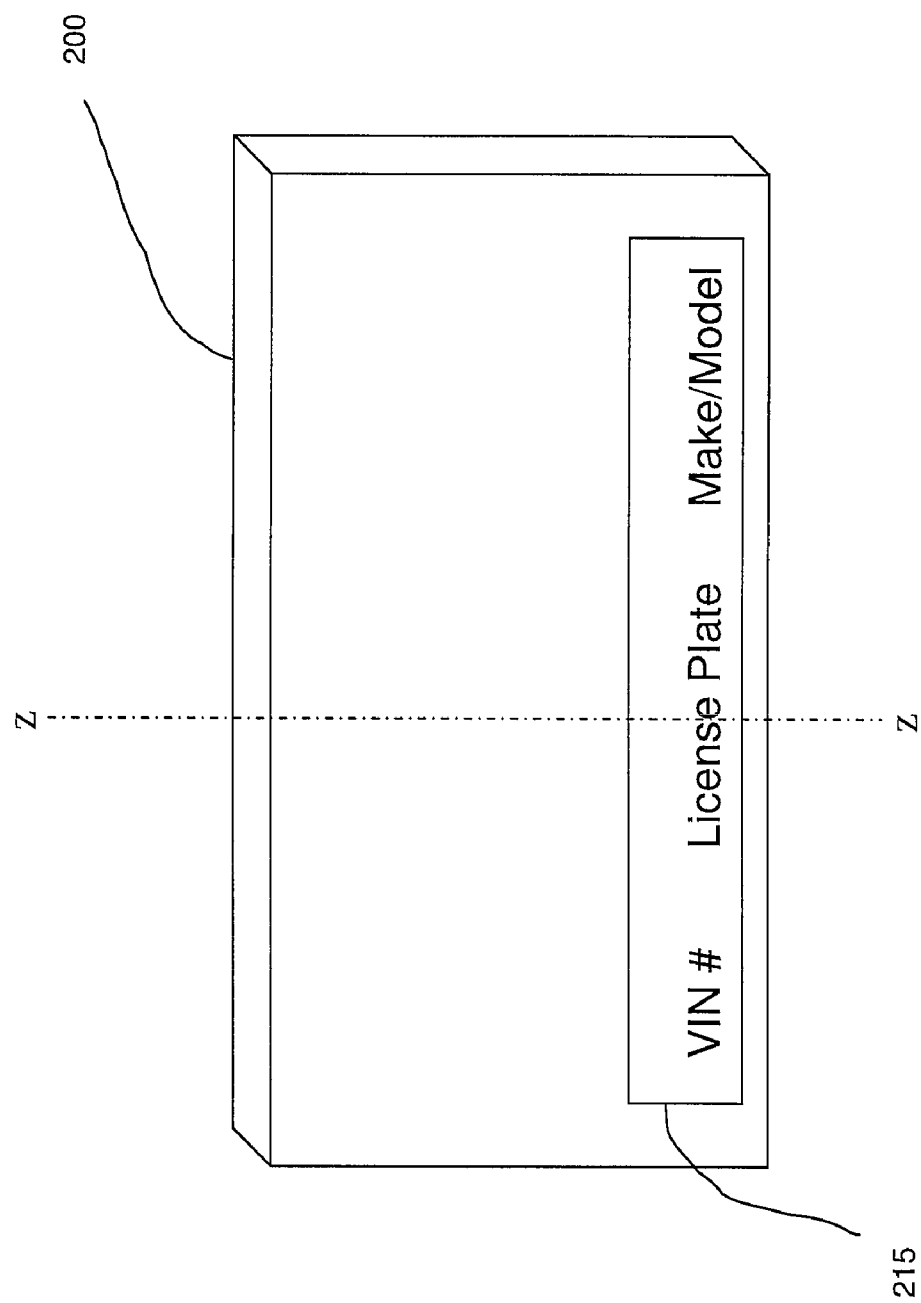
FIG. 5 is a front plan view of the vehicle information apparatus.

According to FIG. 4, a vehicle information apparatus 200 may further comprise a display 210, a receiver 220, and a deactivation device 230. Additionally, according to FIG. 5, each vehicle information apparatus 200 may include a unique vehicle correlating identifier 215. The vehicle correlating identifier 215 may establish which vehicle 280 the vehicle information apparatus 200 is both coupled to and tracking vehicle information 60 for. As shown in FIG. 5, information for the vehicle correlating identifier 215 may be displayed in a readily visible manner.

As shown in FIG. 4, the receiver 220 may communicate with the transmitter 80 to receive the deactivating signal 70. The display 210 may indicate the vehicle information 60. Further, the display 210 may specifically include particular identifying information so that the vehicle information apparatus may be visually identified and coupled to the vehicle 280. The display 210 may be, for example, an electronic indicating display. Also the display 210 may be, but is not limited to, a hologram display, a liquid crystal display, a patterned image display, a lighted display, an LED display, a computer monitor display, or a television display. Once the receiver 220 receives the deactivating signal 70 from the transmitter 80, the receiver 220 may then communicate to the deactivation device 230 to deactivate the display 210. For example, the deactivation of the display 210 by deactivation device 230 may be a complete disablement of the display 210 of the vehicle information apparatus 200. The deactivation device 230 may include, but is not limited to, an electrical means of deactivation, a chemical means of deactivation, or a mechanical means of deactivation.

Figure 6:
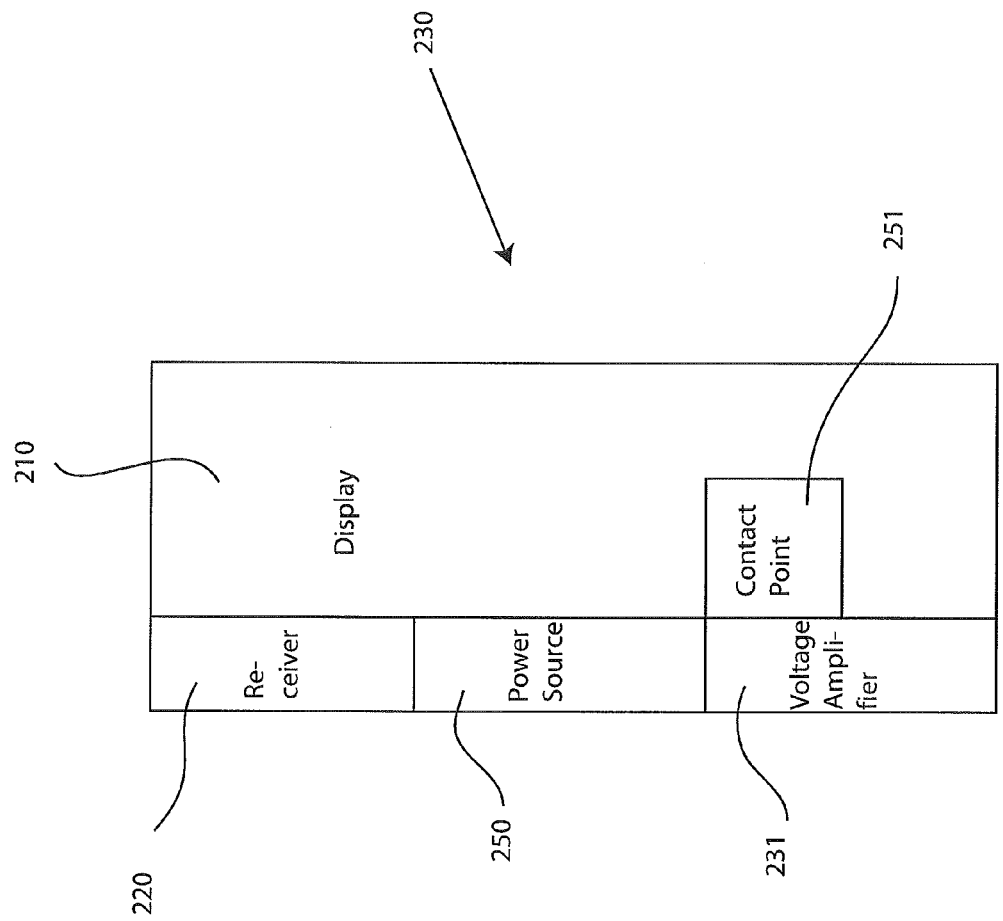
FIG. 6 is cut-away view of an embodiment of the vehicle information apparatus of FIG. 5, along z axis.

The deactivation device 230 may be an electrical means of deactivating the display 210 as shown in FIG. 6. That is, the deactivation device 230 may comprise a voltage amplifier 231 and power source 250. When the receiver 220 communicates the deactivating signal 70 to deactivation device 230, the power source 250 may create a voltage which may be amplified by the voltage amplifier 231. As shown in FIG. 6, the power source 250 and the voltage amplifier 231 may be connected to the display 210 by contact points 251. As the current travels through the display 210 by the contact points 251, the current may destroy the display 210, thereby completely disabling the display 210. This may be the case if the display has electrical components. That is, if the display 210 comprises a series of lighted lights or an electronic display, the current may be great enough to burn out one or more accompanying bulbs or lights permanently, thereby completely disabling one or more indicating components of the display 210. Or, if the display 210 is a hologram member 211, the current may burn the holographic display, completely disabling the display 210. Furthermore, the current may blow a fuse-like portion of possible electrical wiring.

Figure 7:
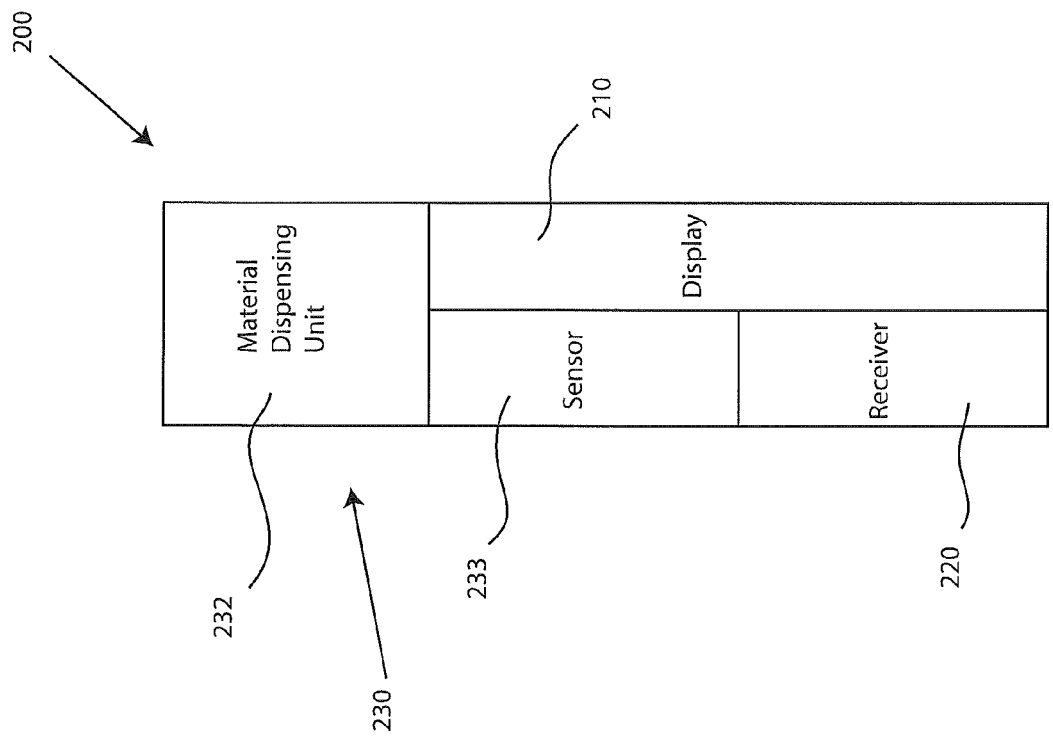
FIG. 7 is cut-away view of an embodiment of the vehicle information apparatus of FIG. 5, along z axis.

The deactivation device 230 may be a chemical means of deactivating the display 210. That is, the deactivation device 230 may comprise a sensor 233 and material dispensing unit 232 as shown in FIG. 7. Further, the material dispensing unit 232 may contain a reactive material 235. When the receiver 220 communicates the deactivating signal 70 to deactivation device 230, the sensor 233 of the deactivation device may then sense the deactivating signal 70 and communicate to the material dispensing unit 232 to dispense the reactive material 235. The material dispensing unit 232 may be located in close proximity to the display 210 such that when sensor 233 receives the deactivating signal 232, the reactive material 235 may be dispensed onto the display 210. The reactive material may, for example, be injected into, projected onto, or forced via gravity onto the display 210 by the deactivation device 230.

The reactive material 235 may comprise any material known to those skilled in the art that would cause the display 210 to be completely disabled. For example, if the display 210 was one of electronic display, a reactive material 235 may be water injected into the display 210 by the deactivation device 230, which would then cause the display 210 to short out and completely be disabled. Or, if the display 210 was one of materials sensitive to certain chemicals, as exemplary materials, a plastic or a film, the reactive material 235 may be a material that reacts with the display 210, thereby causing it to dissolve, misform, discolor, or even burn. Such reactive materials include, but are not limited to, acids, bases, and certain industrial chemicals like acetone, which dissolves plastic. Also, the reactive material 235 that is released from the material dispensing unit 232 may not react directly with the display 210 to disable the display 210. For example, the material dispensing unit 232 may separately contain two compounds that are released and combined upon the receipt of the deactivating signal 70 by the sensor 233. The combination of the two chemical compounds may result in a reactive material 235 comprising an exothermic reaction, which characteristically releases energy from the reaction in the form of heat. The amount of heat released from the reaction into the vehicle information apparatus 200 may then completely destroy the display 210.

The deactivation device 230 may be a mechanical means of deactivating the display 210. That is, the deactivation device 230 may comprise a sensor 233 and material dispensing unit 232. This example of a mechanical means of deactivating the display 210 is shown in FIG. 7 with the exception that the material dispensing unit 232 contains, for example, an ink 236. When the receiver 220 communicates the deactivating signal 70 to deactivation device 230, the sensor 233 of the deactivation device 230 may then sense the deactivating signal 70 and communicate to the material dispensing unit 232 to dispense the ink 236. The material dispensing unit 232 may be located in close proximity to the display 210 such that when sensor 233 receives the deactivating signal 232, the ink 236 may be dispensed onto the display 210. The ink 236 may be injected into, projected onto, or forced via gravity onto the display 210. Once the ink 236 is dispensed onto the display 210, the display 210 may be completely disabled. The ink 236 may be permanent ink or ink with reactive qualities that may alter the material that it comes into contact with, causing an otherwise non-reversible affect. Additionally, the ink 236 may even be water soluble, provided that the vehicle information apparatus 200 is secured in such as manner as to prevent a user from tampering with the device once it is completely disabled. Further, ink 236 dispensed onto each display 210 of the vehicle information apparatus 200 will disable the display 210. Specifically, ink 236 may disable an electronic display, a holographic display, a television or computer monitor display, a lighted display or a colored/patterned display.

Alternately, an additional mechanical means of disabling the display 210 is that the material dispensing unit 232 may release a covering to securely cover the display 210 of the vehicle information apparatus 200, thereby completely disabling it. The covering may be may be fabric, plastic, polymer, metallic, vinyl, or wooden in composition, and the covering may be one large piece or a series of small pieces that come together to completely cover the display 210.

Figure 8:
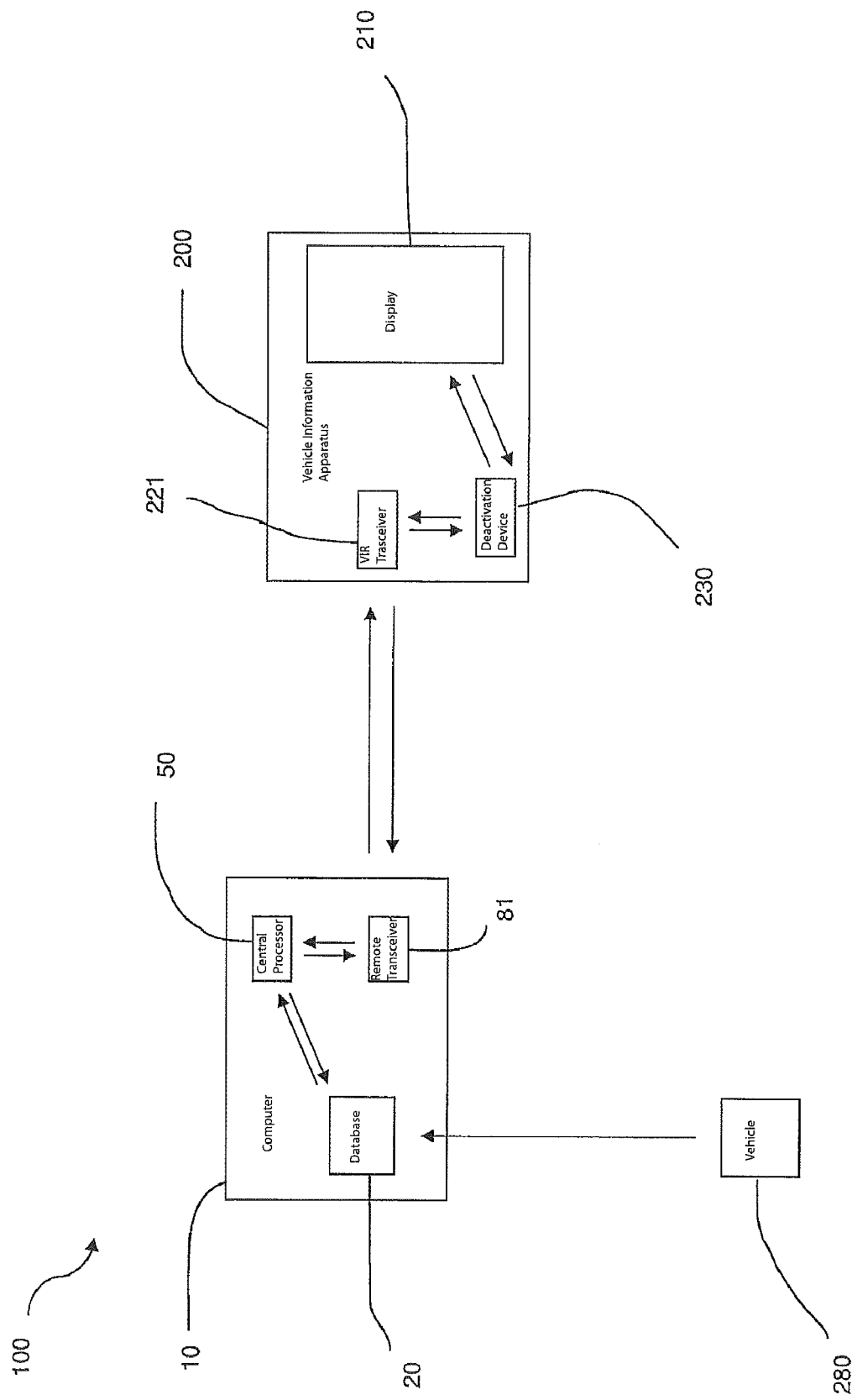
FIG. 8 is a diagram of an embodiment of a vehicle information system.

An additional embodiment provides that once the display 210 is completely disabled, the vehicle database 20 of the computer 10 may be affirmatively updated to reflect those results. That is, the receiver 220 of the vehicle information apparatus 200 and the transmitter 80 of the computer 10 may alternatively each be a transceiver. As shown in FIG. 8, in such an embodiment, the VIR (vehicle information apparatus) transceiver 221 may receive the deactivating signal 70 from the remote transceiver 81 (which is coupled to the central processor 50 of the computer 10). Once the VIR transceiver 221 receives the deactivating signal 70, it may communicate the deactivating signal 70 to the deactivation device 230. The deactivating device 230 may then disable the display 210. The completed disablement may then be communicated back to the VIR transceiver 221 as a device disabled signal 71. The VIR transceiver 221 may then transmit the device disabled signal 71 back to the remote transceiver 81 of the computer 10. The remote transceiver 81 may then communicate the device disabled signal 71 to the central processor 50. Then, the central processor 50 may convert the signal to information and update the vehicle database 20 with the device disabled information 61. In this manner, the vehicle database 20 of the computer 10 may have the most current information available for each vehicle V 280 of a plurality of vehicles 21 within the vehicle database 20. That way, as previously discussed, the vehicle status may reflect the most present status of the vehicle 280.

Additionally, this embodiment may be utilized as an iterative process. That is, the vehicle database 20 may be constantly updated when the display 210 of a vehicle 280 has been disabled. Therefore, if a deactivating signal 70 is sent out to a vehicle 280 and no device disabled signal 71 is received by remote transceiver 81 of the computer 10, then the vehicle database 20 may, through a database program or function, change the vehicle status 30 to, for example, an unconfirmed disabled status 61. With this unconfirmed disabled status 61, the computer 10 may then begin a repeating iteration of transmitting the deactivating signal 70. The deactivating signal 70 may be sent to the vehicle information apparatus 200 of a vehicle 280 once every cycle, where the cycle is a predetermined, preset period of time. The deactivating signal 70 may be repeatedly sent to the vehicle information apparatus 200 until the device disabled signal 71 is received by the remote transceiver 81 and entered into the vehicle database 20.

The iterative-type signaling discussed above may be used to overcome certain variables that may otherwise present a problem to the vehicle information system 100. For example, if a vehicle information apparatus 200 is out of range of signaling, underground, damaged, or otherwise tampered with in a manner that would prevent deactivation of the display 210, the vehicle database 20 will not reflect a disabled vehicle information apparatus 200 until such a device disabling signal 71 is received. Additionally, the device disabling signal 71 may be one of a verified bandwidth, encoded, or otherwise encrypted to prevent tampering or creation of a counterfeit signal by a user. If a vehicle information apparatus 200 is not updated within a certain predetermined amount of time, the computer system may create a notification to law enforcement or other authorities of the vehicle's non-compliant status. This, in turn, may lead to a report of a stolen, abandoned, or otherwise lost car, or additionally, prompt ticketing by law enforcement for a delinquent vehicle owner, user, or possessor of a vehicle 280.

Figure 9:
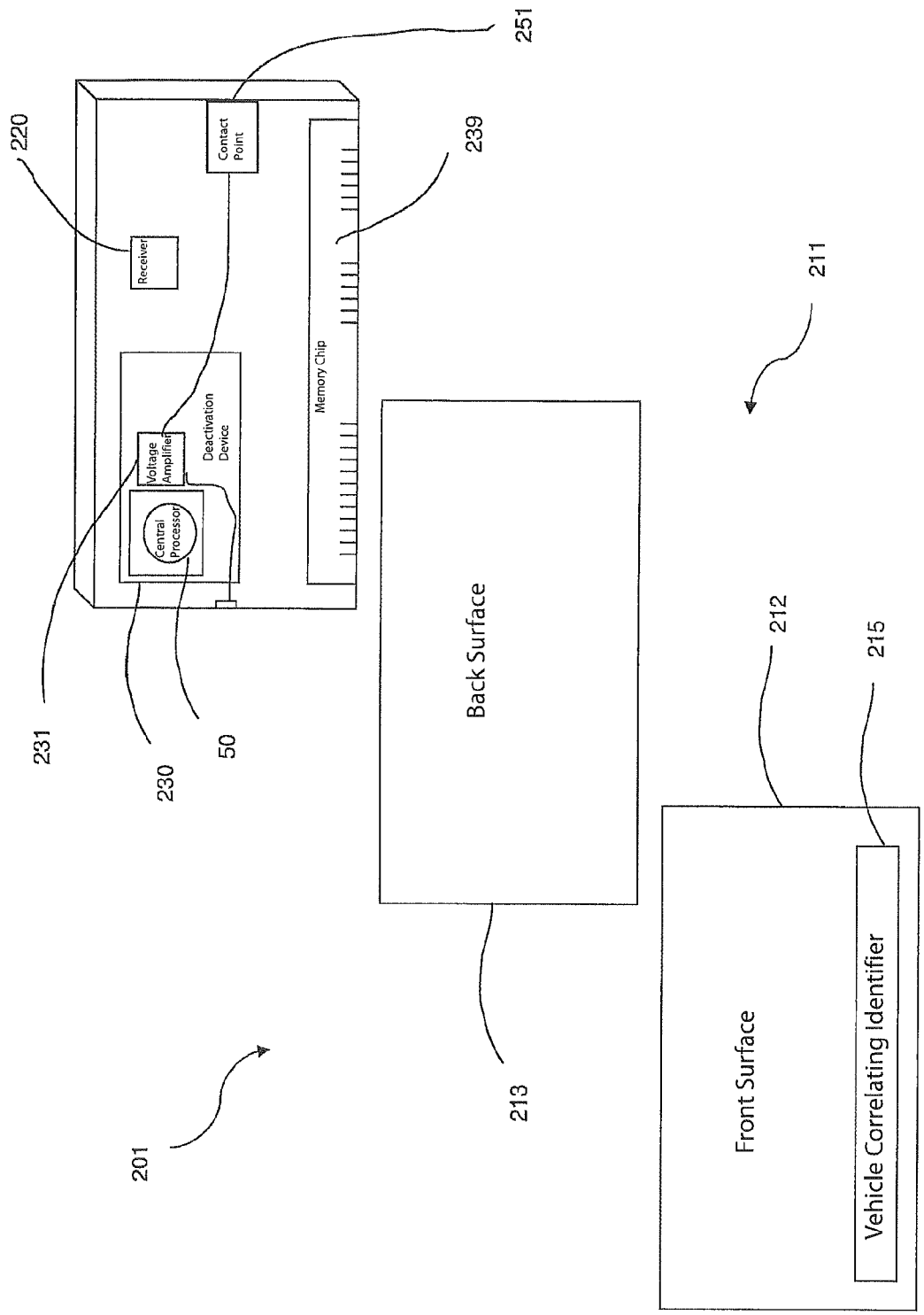
FIG. 9 is an exploded perspective view of an embodiment of the vehicle information identifier apparatus.

Another embodiment of the present invention relates to a vehicle information identifier apparatus 201, as illustrated in FIG. 9. The vehicle information identifier apparatus 201 comprises a hologram member 211, a receiver 220, a deactivation device 230, and a substantially encasing member 270. Each component will be more fully discussed below.

As shown in FIG. 9, the hologram member 211 may have a front surface 212 and a back surface 213. The front surface 212 of the hologram member 211 may display an authenticated image to observers, representing, for example, current insurance coverage and valid inspection and vehicle 280 registration. The hologram member 212 material may be, for example, a photographic emulsion, a dichromated gelatin, photoresists, photothermoplastics, photopolymers, photochromics, photorefractives, and the like, and/or combinations thereof.

Referring to FIG. 9, the hologram member 211 may, for example, comprise a thin film for the front surface 212 coupled to an opaque material as the back surface 213. Such a composition may, for example, prevent light transmission through the front surface 212 into the vehicle information identifier apparatus 201, where such light transmission may otherwise allow a user to view the internal parts of the vehicle information identifier apparatus 201, facilitating a user's ability to tamper or reproduce the vehicle information identifier apparatus through counterfeiting.

Figure 11:
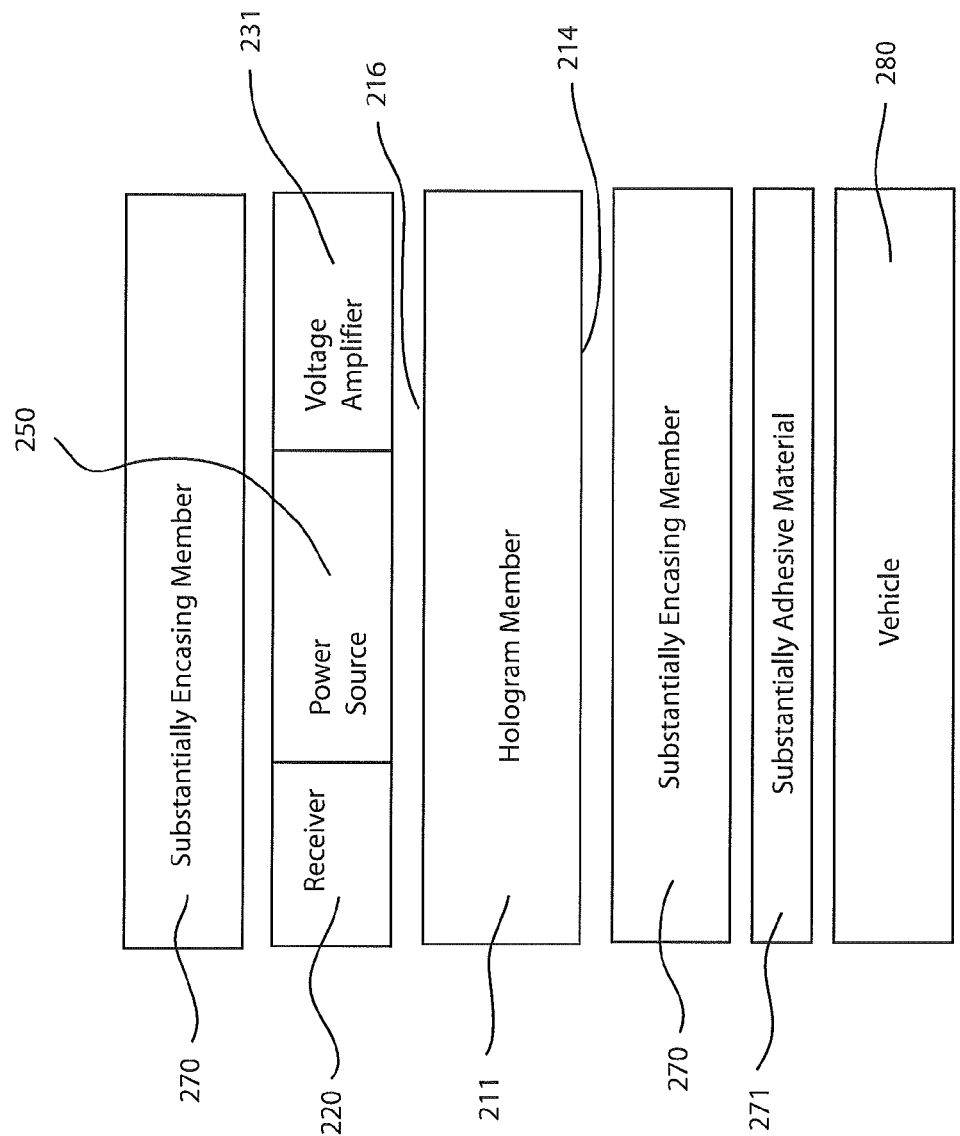
FIG. 11 is a cut-away exploded side view of the vehicle information identifier apparatus.

Referring to FIG. 11, an additional example of the hologram member 211 may comprise an imprinted hologram 214 on a conductive sheet 216. That is, the hologram member 211 may have a front surface 212 and a back surface 213, as shown in FIG. 11. The front surface 212 of the hologram member 211 may then refer to the imprinted hologram 214 on the face of the conductive sheet 216. The back surface 213 may refer to the rear portion of the non-imprinted conductive sheet conductive sheet 216. The imprinted hologram 214 on the conductive sheet 216 is incorporated into the vehicle information identifier apparatus 201 in such a manner so that when the hologram member 211 is incorporated into the vehicle information identifier apparatus 201, the imprinted hologram 214 of the hologram member 211 may be readily visible to an observer. For example, the hologram member may be a tungsten sheet that has a hologram imprinted on its face.

Additionally, the hologram member 211 may include any particular colors or patterns as may be selected by the issuing party. The hologram member 211 may, for example, be a three-dimensional logo that is particular to the state in which the vehicle 280 is, for example, registered in. The hologram member 211 may also, for example, be of differing colors or patterns depending, for example, upon an authorized issuer's preferences and administration.

The hologram member 211 may also contain the vehicle correlating identifier 215. The vehicle correlating identifier 215 may be either a either a portion of or an entirety of the holographic image of hologram member 211. That is, the three dimensional aspect of the hologram member 211 may encompass the vehicle correlating identifier 215. Alternatively, the hologram member 211 and the vehicle correlating identifier 215 may be overlaid upon one another in such a manner so that both may be readily visible to an observer.

Referring to FIG. 9, the hologram member 211 comprises a front surface 212 and a back surface 213, where the front surface 212 may be a thin film through which light readily transmits and the back surface 213 may be an opaque backing. The vehicle correlating identifier 215 may then be coupled to the front surface 212, either in front of, or behind the front surface 212. For example, the vehicle correlating identifier 215 may be integral to the back surface 213, which is coupled to front surface 212. The vehicle correlating identifier 215 may be readily viewed in either position, as the front surface 212 may comprise a thin film through which light is readily transmitted.

In FIG. 11, in which the hologram member 211 may be a metallic sheet, the vehicle correlating identifier 215 may be overlaid onto the front surface 212 of the hologram member 211. In operation, the hologram member 211 is readily visible, although a portion of the hologram member 211 may be blocked by the vehicle correlating identifier 215. In operation, a portion of the hologram member 211 may still be visible such that those in proximity of the vehicle information identifier apparatus 201 are able to see and appreciate the authenticity of the vehicle information identifier apparatus 201.

Figure 10:
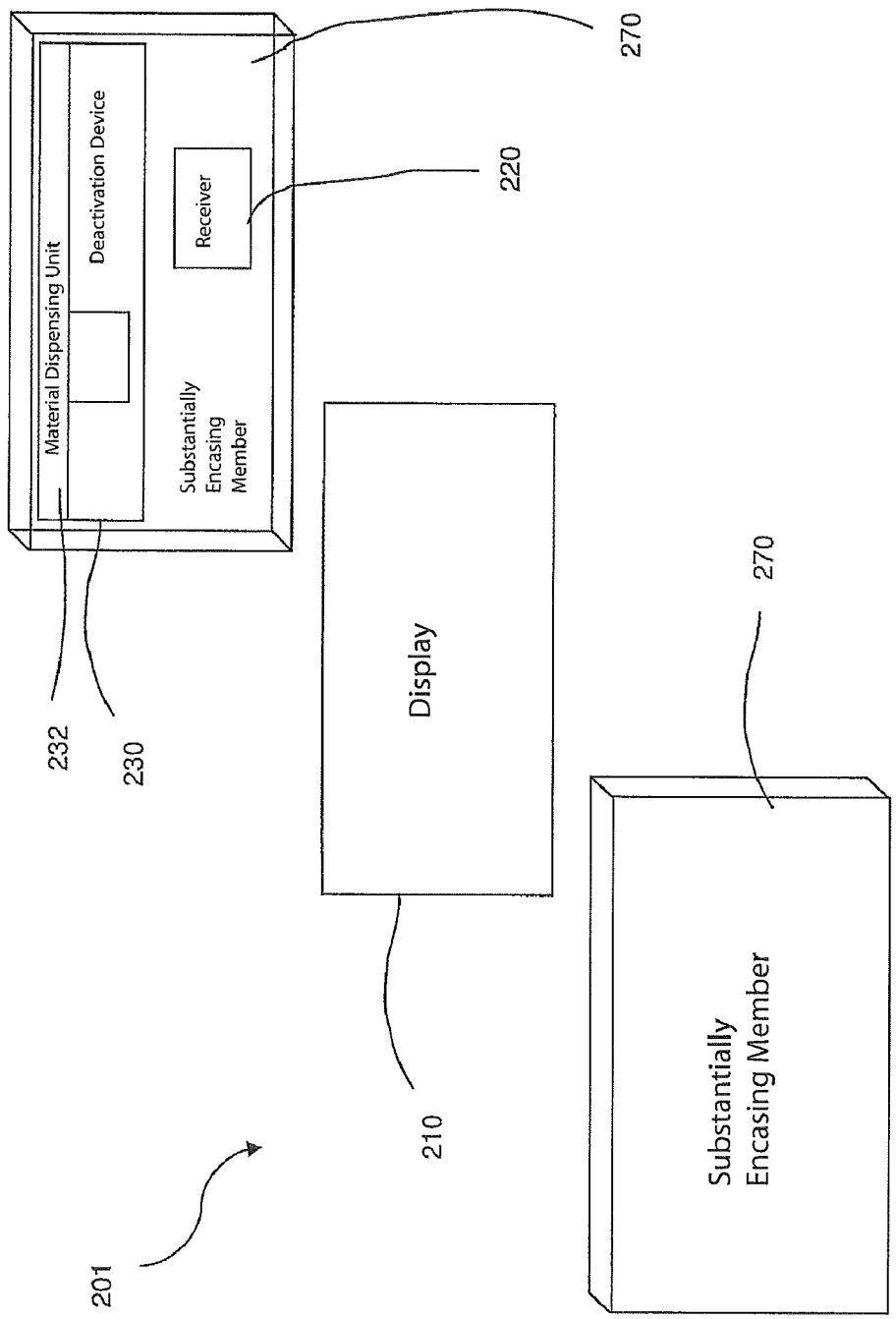
FIG. 10 is an exploded perspective view of an embodiment of the vehicle information identifier apparatus.

The vehicle information identifier apparatus 201 may also comprise a receiver 200. The receiver 200 is formatted to receive a deactivating signal 70. Examples of the deactivating signal 70 may be, but are not limited to, an electromagnetic signal, a satellite distributed signal, an IR signal, a radio signal, a microwave signal, a laser signal, or a sonic signal. Referring to FIG. 9 and FIG. 10, the receiver 220 may be coupled to the deactivating device 230. Once the deactivating signal 70 is received, the receiver 220 may then communicate to the deactivation device 230 of the vehicle information identifier apparatus 201 to deactivate the display 210. For example, the deactivation of the display 210 by deactivation device 230 may be a complete disablement of the display 210 of the vehicle information apparatus 200. The deactivation device 230 may include, but is not limited to, an electrical means of deactivation, a chemical means of deactivation, or a mechanical means of deactivation.

The deactivation device 230 may be an electrical means of deactivation of the hologram member 211. As shown in FIG. 9, the deactivation device 230 may comprise a voltage amplifier 231 and power source 250. When the receiver 220 communicates the deactivating signal 70 to deactivation device 230, the power source 250 may create a voltage which may be amplified by the voltage amplifier 231. As shown in FIG. 9, the power source 250 and the voltage amplifier 231 may be connected to the hologram member 211 by wires 252 that connect to contact points 251. As the current travels through the display 210 by the contact points 251, and the current may destroy the hologram member 211, thereby completely disabling the hologram member 211. The voltage of the power source 250, amplified by voltage amplifier 231 may be great enough to cause the hologram member 211 to burn, and may, for example, blacken out completely. At this point, the hologram member 211 is completely destroyed, and as such, is completely disabled.

The deactivation device 230 may be a chemical means of deactivating the hologram member 211. That is, the deactivation device 230 may comprise a sensor 233 and material dispensing unit 232 as shown in FIG. 10. Further, the material dispensing unit 232 may contain a reactive material 235. When the receiver 220 communicates the deactivating signal 70 to deactivation device 230, the sensor 233 of the deactivation device may then sense the deactivating signal 70 and communicate to the material dispensing unit 232 to dispense the reactive material 235. The material dispensing unit 232 may be located in close proximity to the hologram member 211 such that when sensor 233 receives the deactivating signal 232, the reactive material 235 may be dispensed onto the hologram member 211. The reactive material may be injected into, projected onto, or forced via gravity onto the hologram member 211 by the deactivation device 230.

The reactive material 235 may comprise any material known to those skilled in the art that would cause the hologram member 211 to be completely disabled. The hologram member 211 may be of materials that are sensitive to certain chemicals. For example, the hologram member 211 may be a plastic or a film and the reactive material 235 may be a material that reacts with a plastic or a film and thereby causes the hologram member 211 to dissolve, misform, discolor, or even burn. Such reactive materials 235 include, but are not limited to, acids, bases, and certain industrial chemicals like acetone, which dissolves plastic. Also, the reactive material 235 that is released from the material dispensing unit 232 may not react directly with the hologram member 211 to completely disable it. That is, the reactive material 235 will react with the hologram member 211 and cause it to dissolve, misform, discolor, or burn, and completely disable the three-dimensional image component of the hologram member 211. For example, the patterns, colors, or three-dimensional quality of the displayed image of the hologram member 211 may be replaced with a black surface. Such a change in the visual characteristics of the vehicle information identifier apparatus 201 would easily and readily demonstrate to an observer or user that the vehicle 280 is non-compliant in at least one vehicular status 30.

As another example of a reactive material 235, the material dispensing unit 232 may separately contain two compounds that are released and combined upon the sensor's 233 receipt of the deactivating signal 70. The combination of the two chemical compounds may result in a reactive material 235 comprising an exothermic reaction, which characteristically releases energy from the reaction in the form of heat. The amount of heat released from the reaction into the vehicle information apparatus 200 may then burn the hologram member 211, thereby completely disabling the characteristic image of the hologram member 211.

The deactivation device 230 may be a mechanical means of deactivating the hologram member 211. That is, the deactivation device 230 may comprise a sensor 233 and material dispensing unit 232. This example of a mechanical means of deactivating the hologram member 211 is shown in FIG. 10 with the exception that the material dispensing unit 232 contains, for example, an ink 236 in lieu of reactive material 235. The ink may be of any color, so long as the contrast between the characteristic image of hologram member 211 and the completely disabled image of the hologram member 211 are readily contrasted and easily differentiated by a user or an observer. The ink 236 may also be, for example, either opaque or very dark in color such that light is not readily transmitted through the ink 236 onto the hologram member 211.

When the receiver 220 communicates the deactivating signal 70 to deactivation device 230, the sensor 233 of the deactivation device 230 may then sense the deactivating signal 70 and communicate to the material dispensing unit 232 to dispense the ink 236. The material dispensing unit 232 may be located in close proximity to the hologram member 211 such that when sensor 233 receives the deactivating signal 232, the ink 236 may be dispensed onto the hologram member 211. The ink 236 may be injected into, projected onto, or forced via gravity onto the display 210. Once the ink 236 is dispensed onto the hologram member 211, the hologram member 211 may be completely disabled. That is, the characteristic image of the hologram member 211 may be replaced with a monochromatic ink 236. The ink 236 may also be permanent, to the effect that once the ink 236 comes into contact with the hologram member 211, it will bond to the surface of the hologram member 211. Again, such an interaction would permanently completely disable the hologram member 211. Additionally, the ink 236 may even be water soluble, provided that the vehicle information apparatus 200 is secured in such as manner as to prevent a user from tampering with the device once it is completely disabled.

Alternately, an additional mechanical means of disabling the hologram member 211 may be that the material dispensing unit 232 may release a covering 237, such as a shutter, cap, lid, plate or other physical implement, to securely cover the hologram member 211 of the vehicle information apparatus 200, thereby completely disabling it. Once the hologram member 211 is covered by the covering 237, the characteristic image of the hologram member 211 is no longer readily displayed and as such, the vehicle information identifier apparatus 201 is completely disabled. The covering 237 may be may be fabric, plastic, polymer, metal, wood, or any combination of those materials. Also, the covering 237 may be one large piece or a series of small pieces that come together to completely cover the hologram member 211.

The vehicle information apparatus also may comprise a substantially encasing member 270. Such a substantially encasing member 270 is shown, for example, in FIG. 10 and FIG. 11. The substantially encasing member 270 may be configured to removably attach to a vehicle 280. The substantially encasing member 270 may form the outer most component of the vehicle information identifier apparatus. The substantially encasing member may be composed of, for example, metal, glass, plastic, polymer, wood, fabric, vinyl, nylon, or a combination thereof. Depending upon the material, the substantially encasing member may cover either a portion or the entire vehicle information identifier apparatus 201. That is, the hologram member 211 should be readily visible when the substantially encasing member is fixed to the vehicle information identifier apparatus 201 components.

The substantially encasing member 270 may completely encase the aforementioned vehicle information identifier apparatus 201 components when at least a portion of the substantially encasing member 270 that will be located over the hologram member 211 is composed of materials that are transparent or translucent. For example, a plastic may be used, where at least the portion of the plastic located immediately over the hologram member 211 is translucent or transparent such that the hologram member may be viewed through the substantially encasing member 270. A substantially encasing member 270 made of non-transparent or non-translucent material may encase a portion of the aforementioned vehicle information apparatus 201 components. For example, a non-transparent or non-translucent material such as metal, opaque plastic, wood, vinyl, or fabric may encase a portion of the vehicle information identifier apparatus 201 components, while still allowing the hologram member 211 to be readily visible to observers. Even when partially encasing the vehicle information identifier apparatus 201 components, the substantially encasing member 270 may encase a portion of the hologram member 211 so that the vehicle information identifier apparatus 201 may be as completely encased as possible while still allowing the hologram member 211 to be readily seen by an observer. A substantially encasing member 270 that encases a portion or the entirety of the hologram member and the other vehicle information identifier apparatus 201 may also exclude moisture, dirt, dust, or other contaminants from getting into the vehicle information identifier apparatus 201. The substantially encasing member 270 may be of any color or shape.

Further, the substantially encasing member 270 may be of a size that accommodates the vehicle information identifier apparatus 201 components, while maintaining a discreet size so that it may be located on the window of a vehicle 280, or immediately adjacent to the license plate of the vehicle 280, and not block either the driver's view or an observer's view of the license plate of the vehicle 280.

The substantially encasing member 270 may, for example, be one integral piece that is prefabricated. Also, the substantially encasing member 270 may, as an additional example, be at least two pieces that are coupled together to encase the vehicle information identifier apparatus 201. The substantially encasing member 270 may provide the vehicle information identifier apparatus 201 with a secure encasing to prevent unauthorized users from gaining access to the internal components of the vehicle information identifier apparatus 201.

Additionally, the substantially encasing member 270 may be equipped with security features to prevent users from tampering with the vehicle information identifier apparatus 201. For example, the vehicle information identifier apparatus 201 may be equipped with a tamper-detecting sensor 240 that is coupled to the deactivating device 230. Then, if one part of the vehicle information identifier apparatus 201 is physically displaced by a certain predetermined amount from another part of the vehicle information apparatus 201, the tampering-detecting sensor may communicate to the deactivating member 230 to deactivate the hologram member 211. The same methods previously discussed with respect to the various ways to implement the deactivating device 230 may also be practiced with the tampering-detecting sensor 240, thereby disabling the hologram device 211 completely.

The vehicle information identifier apparatus 201 may also have a substantially adhesive material 271 spread over at least one if its faces. Referring to FIG. 1, FIG. 3, and FIG. 11, the substantially adhesive material 271 may be located, for example, on face of the hologram member 211. With the substantially adhesive material 271 located in this manner, the display image from the hologram member 211 may be, in effect, secured to a vehicle 280 window so that the hologram member 211 may be readily visible to an observer. Alternatively, the substantially adhesive material 271 may be located, for example, on the substantially encasing member 270, on its face which is directly opposed to the hologram member 211. Referring to FIG. 2, the substantially adhesive material 271 may be used to affix the substantially encasing member 270 to an exterior part of a vehicle 280, thereby securing the vehicle information identifier apparatus 201 thereto and allowing the hologram member 211 to be readily displayed.

The substantially adhesive material 271 may be protected prior to use with a removably attached sheet 273. As shown in FIG. 11, the removably attached sheet 273 may be configured to fit alongside at least one side of the vehicle information identifier apparatus 201 and may then, for example, secure and protect the substantially adhesive material 271 from foreign objects or other contamination prior to use on a vehicle 280. The removably attached sheet 273 may also contain instructions. Such instructions may, for example, instruct the user on how to properly install the vehicle information apparatus, instruct the user on how to properly inspect and register a vehicle 280, or obtain driving insurance for a vehicle 280. Additionally, the removably attached sheet 273 may include, for example, contact information for the party that issued the vehicle information identifier apparatus 201. The removably attached sheet 273 may also include, for example, the penalties and fines applicable for permitting a vehicle 280 registration or insurance policy lapse. Also, the removably attached sheet may include, for example, a warning against tampering with the vehicle information identifier apparatus 201. It should be noted that such examples of the potential provisions on the removably attached sheet 273 are meant to be exemplary, not limiting.

The vehicle information identifier apparatus 201 may be issued to a vehicle 280 as a ready to use device, onto which the vehicle correlating identifier 215 may be etched, adhered, attached, or otherwise secured onto the vehicle information identifier apparatus 201. Alternatively, the vehicle information identifier apparatus 201 may be individually programmed prior to issuance. That is, the vehicle information identifier apparatus 201 may further comprise a programmable read-only memory chip 239 (hereinafter PROM). The PROM 239 may be incorporated onto the vehicle information identifier apparatus 201 such that the PROM 239 is readily accessible to the authorizing party. The PROM 239 may be used, for example, to enable the vehicle information identifier apparatus 201, to program the iterative process for confirmed deactivation of the apparatus 201, to link the database entry for the vehicle 280 with that unique vehicle information identifier apparatus 201, to program the vehicle correlating identifier 215, to code or encrypt the identifying vehicle information into the device in case the visual vehicle correlating identifier 215 becomes lost from visual or photographic perception. Such aforementioned disclosures are meant to be exemplary PROM uses, not limiting.

Another embodiment of the present invention relates to a method for displaying vehicle information 300. The method for displaying vehicle information 300 is shown in FIG. 12. The method for displaying vehicle information 300 may comprise: providing a vehicle information system 310; generating a current vehicle information 320; converting said current vehicle information into the deactivating electronic signal 330; transmitting the deactivating signal to the vehicle information apparatus receiver 340; receiving said deactivating signal 350; and disabling said display with said deactivation device to identify the current vehicle information 360.

A vehicle information system 100 provided for the method of displaying vehicle information 300 may include: (1) a computer 10 having a vehicle database 20 adapted for storing a vehicular status 30 for a plurality of vehicles 21; (2) a central processor 50 of said computer 10; (3) a transmitter 80, for transmitting a deactivating signal 70; and (4) a vehicle information identifier apparatus 201. The vehicle information apparatus 200 of the vehicle information system 100 includes: (a) a display 210, wherein said display 210 indicates an initial vehicle information 63; (b) a receiver 220, for receiving the deactivating signal 70 from the transmitter 80; and (c) a deactivation device 230, configured to deactivate the display 210. The display 210 may indicate an initial vehicle information 63 by, for example, displaying a characteristic image of the vehicle information apparatus 200 as issued.

In addition, the method of displaying vehicle information 300 may include generating a current vehicle information 64. This is done, for example, by periodically reviewing and updating each vehicle information 60 within each vehicular status 30 for a plurality of vehicles 21 in the vehicle database 20. Also, there may be certain events which may cause a current vehicle information 64 to be generated and entered into the vehicle database 20. Some of these events may include, but are not limited to: selling a vehicle 280; reporting a vehicle 280 stolen; moving to a foreign state or country; changing the title of the vehicle 280; issuing a police report with respect to vehicle 280 or its owner or user; lapsing in inspection and vehicle 280 registration; expiration, cancellation, or otherwise inactivation of vehicle 280 insurance; revoking commercial permit status for a vehicle 280; or entering an incomplete or unknown vehicle information for any of the vehicular status 30 fields listed within the vehicle database 20.

The generation of a current vehicle information 64 which has been pre-selected as the independent variable from which the vehicle information apparatus 200 depends may initiate the central processor 50. The central processor 50 may facilitate conversion of the current vehicle information 64 into a deactivating signal 70. The deactivating signal 70 may then be then communicated to the transmitter 80. The transmitter 80 may then transmit the deactivating signal 70 to the vehicle information apparatus 200 receiver 220. For example, the transmission may include the propagation of an electromagnetic signal. The receiver 220 may then receive the deactivating signal 70 from the transmitter 80. From the receiver 220, the deactivating signal 70 may then be communicated to the deactivating device 230. The deactivating device 230 may then disable the display 210. Once the display 210 has been completely disabled by the deactivating device 230, the vehicle information apparatus 200 may then identify the current vehicle information 64. That is, the disablement of the display 210 may itself be an indicator that the information on which the vehicle information apparatus 200 depends has changed within the vehicle database 20.

Disabling the display 210 may be accomplished through electrical, chemical, or mechanical means, as discussed in detail supra. For example, disabling said display 210 may comprise amplifying the voltage of a power source 50 that is operably attached to the display 210. The voltage of the power source 50 may be amplified by a voltage amplifier 231. The amplified voltage may then act on the display 210 char or burn the display 210, thereby disabling it. As another example, disabling said display 210 may comprise breaking a material dispensing unit 232, thereby releasing a reactive material 235 to disable the display 210. The reactive material may include, for example, an acid. For example, acids may be hydrogen halides (including acids HCl, HBr, or HI), oxyacids of halogens (including acids $HClO_3$, $HClO_4$, $HBrO_3$, $HBrO_4$, or $HIO_3$, or $HIO_4$), sulfuric acid ($H_2SO_4$), or nitric acid ($HNO_3$). It should be noted that the list of potential acids is meant to be illustrative and not limiting. The acid may then burn, char, or otherwise react with the display 210, thereby disabling it. As still another example, disabling the display 210 may comprise dispensing an ink 236 of a material dispensing unit 232. The ink 236 may be contained in the material dispensing unit 232 until the ink 236 may be dispensed onto the display 210. The ink 236 may then completely disable the display 210, as the display 210 will no longer display a characteristic image of a vehicle information apparatus 200 that was initially issued to a vehicle 280.

While particular embodiments of the present invention have been described herein for purposes of illustration, many modifications and changes will become apparent to those skilled in the art. Accordingly, the following claims are intended to encompass all such modifications and changes as fall within the true spirit and scope of this invention.

I claim:

1. A vehicle information system, comprising:
   a remote computer having a vehicle database adapted for storing a vehicular status indicative of a status of vehicle information for a plurality of vehicles,
   a central processor of said computer, for converting a vehicle status into a deactivating signal;
   a transmitter, for transmitting the deactivating signal; and
   a vehicle information apparatus located on a vehicle, further comprising:
      a display visible from the vehicle exterior, wherein said display indicates the vehicle information;
      a transceiver, for receiving the deactivating signal from the transmitter and transmitting a display disabled signal to the computer; and
      a deactivation device, wherein the deactivation device is configured to completely disable the display;
   wherein the computer receives said display disabled signal from the transceiver of the vehicle information display apparatus, and wherein the computer updates the vehicle database with display disabled information after receiving the received transmission.

2. The vehicle information system of claim 1, wherein the display comprises a hologram member.

3. The vehicle information system of claim 1, wherein the vehicle information comprises an inactive insurance information.

4. The vehicle information system of claim 1, wherein the vehicle information comprises an expired registration information.

5. The vehicle information system of claim 1, wherein the deactivation device comprises a voltage amplifier and power source.

6. The vehicle information system of claim 1, wherein the deactivation device comprises a sensor and a material dispensing unit.

7. The vehicle information system of claim 1, wherein the vehicular status is selected from the group consisting of: theft status, DMV status, title status, foreign status, law compliance status, emission status, inspection status, registration status, commercial permit status, VIN status, incomplete/unknown status, or combinations thereof.

8. A vehicle information identifier apparatus located on a vehicle, comprising:
   a display, comprising: a hologram member, said hologram member having a front surface and a back surface;
   a transceiver, said transceiver configured to receive a deactivating signal and transmit a display disabled signal to the source of the deactivating signal, wherein the source of the deactivating signal is a computer configured to receive the display disabled signal from the transceiver of the vehicle information display identifier apparatus and automatically update a vehicle database with display disabled information after the computer receives the display disabled signal;
   a deactivation device, said deactivation device coupled to the transceiver utilized for disabling the display once the transceiver receives said deactivating signal; and
   a substantially encasing member, said substantially encasing member forming at least a portion of the outer most component of the vehicle information identifier apparatus.

9. The vehicle information identifier apparatus of claim 8, wherein the deactivation device further comprises a voltage amplifier and a power source.

10. The vehicle information identifier apparatus of claim 8, wherein the deactivation device further comprises a sensor and a material dispensing unit.

11. The vehicle information identifier apparatus of claim 8, wherein the vehicle information identifier apparatus further comprises a substantially adhesive material on at least one side of vehicle information identifier apparatus.

12. The vehicle information identifier apparatus of claim 8, wherein the vehicle information identifier apparatus further comprises a removably attached sheet configured to fit along at least one side of said vehicle information identifier apparatus.

13. The vehicle information identifier apparatus of claim 8, further comprising a programmable read-only memory chip.

14. The vehicle information identifier apparatus of claim 8, wherein the hologram member further comprises a hologram imprinted onto a conductive sheet.

15. A method for displaying vehicle information, comprising:
   providing a remote computer having a vehicle database adapted for storing a vehicular status indicative of a status of a vehicle information for a plurality of vehicles, and a central processor of said computer;
   providing a transmitter, for transmitting a deactivating signal; and
   providing a vehicle information apparatus on a vehicle, comprising:
      a display visible from the vehicle exterior, wherein said display indicates an initial vehicle information;
      a transceiver, for receiving the deactivating signal from the transmitter and transmitting a display disabled signal to the computer; and
      a deactivation device, configured to deactivate the display;
   generating, by the computer, a current vehicle status;
   converting, by the computer, said current vehicle status into the deactivating signal;
   transmitting, by the transmitter, the deactivating signal to the vehicle information apparatus transceiver;
   receiving said deactivating signal;
   disabling said display with said deactivation device to identify the current vehicle status;
   transmitting, by the transceiver, a display disabled signal to the computer;
   receiving, by the computer, the display disabled signal; and
   updating, by the computer, a vehicle database after receiving the display disabled signal.

16. The method of claim 15, wherein disabling said display comprises amplifying the voltage of a power source that is operably attached to the display to disable the display.

17. The method of claim 15, wherein disabling said display comprises dispensing a reactive material of a material dispensing unit.

18. The method of claim 15, wherein disabling said display comprises dispensing an ink of a material dispensing unit.

19. The method of claim 17, wherein said reactive material comprises an acid.

20. The method of claim 15, wherein transmitting includes propagation of an electromagnetic signal.

* * * * *